United States Patent [19]
Burke et al.

[11] 3,871,013
[45] Mar. 11, 1975

[54] PROCESSOR FOR PHOTOGRAPHIC FILM CASSETTES
[75] Inventors: Edward F. Burke, Reading; Douglas B. Holmes, South Natick, both of Mass.
[73] Assignee: Polaroid Corporation, Cambridge, Mass.
[22] Filed: May 16, 1973
[21] Appl. No.: 360,678

Related U.S. Application Data
[63] Continuation of Ser. No. 214,919, Jan. 3, 1972, abandoned.

[52] U.S. Cl. ................ 354/317, 118/410, 118/415, 352/130, 354/88
[51] Int. Cl. ............................................. G03d 3/00
[58] Field of Search ........ 95/89 R, 13; 352/130, 78, 352/237, 238; 355/98; 118/415, 407, 410, 411, 413

[56] References Cited
UNITED STATES PATENTS
2,766,721 10/1956 Paquette ..................... 118/413 X
2,982,195 5/1961 Nicolini .......................... 352/238 X
3,623,417 11/1971 Eldranta et al. .................... 95/89 R
3,683,780 8/1972 Edelman ......................... 95/89 R X Primary Examiner—Richard L. Moses
Attorney, Agent, or Firm—David R. Thornton

[57] ABSTRACT

A photographic film cassette usable in a motion picture system in which the film is originally supplied in the cassette for exposure, processing and viewing and including a processor with a provision for depositing a developing fluid on the exposed film emulsion under a pressure gradient resulting from film travel past an inclined surface. The film is provided with edge rails to space the fluid treated central portion thereof from the back portion of the film in an adjacent convolution as it is rewound on a supply spool after processing, and a contoured pressure pad is employed to prevent transverse film deflection during pressure application of the developing fluid.

7 Claims, 4 Drawing Figures

PATENTED MAR 11 1975  3,871,013

PROCESSOR FOR PHOTOGRAPHIC FILM CASSETTES

CROSS REFERENCE TO RELATED APPLICATION

This is a continuation of application Ser. No. 214,919, filed Jan. 3, 1972 now abandoned.

BACKGROUND OF THE INVENTION

This invention relates to improvements in processors for photographic film strips and more particularly, it concerns an improved nozzle and film supporting assembly for film cassettes by which processing fluid supplied in the processor is distributed uniformly over the surface of a strip of exposed film under a pressure gradient resulting from travel of the film strip past the processor nozzle.

As a result of recent developments in the motion picture art, a system has been devised by which a supply of light sensitive film contained in a cassette can be exposed in a camera adapted to receive the cassette and then processed or developed to provide the conventional series of positive transparent image frames merely by placing the cassette in a viewing apparatus capable of activating a processor also contained in the cassette such that upon rewinding the exposed film, a coating or layer of processing fluid is deposited along the length of the film. After processing in this manner, the viewing device is operated as a projector to advance the film incrementally, frame by frame past a light source so that the scene to which the film was exposed is reproduced on a screen. Preferably, the processing fluid effects a diffusion transfer of a negative image in a light sensitive emulsion layer to a positive image receiving layer.

While the advance in the motion picture art represented by such a system is apparent and needs no elaboration herein, it is to be noted as critical to satisfactory operation of the system that the processing fluid must be deposited uniformly within extremely small tolerances over the emulsion layer on the film during processing. Failure to achieve such a uniform layer of the developing fluid on the emulsion will result in undesirable blemishes, for example, undeveloped areas will be observed as undesirable vertical streaks in the image viewed during projection of the processed film.

In addition, it is important that the emulsion layer on the film, after having been coated with liquid developing fluid, be protected from mechanical disturbance until it has dried. The major cause for such disturbance in a cassette of the type involved is the contact between successive convolutions in rewinding the film onto the supply spool, resulting in forceable contact between the fluid treated emulsion surface and the back of the film in an adjacent convolution on the spool. This problem has been overcome by providing the film base with a pair of edge-rails of a thickness exceeding that of the fluid coating so that the intermediate portion of the emulsion over which the image frames are formed is held out of contact with the film base of an adjacent convolution on the supply spool. The provision of the rails, however, enhances the probability of transverse film deflection during passage thereof in its run past the processor. Obviously, transverse deflection during the application of the developing fluid is inconsistent with achieving a uniform layer or coating of the processing fluid on the film.

The problems of achieving a uniform layer or coating of the fluid on the film during the processing operation are further exemplified by the requirement that each cassette carry its own processor and further by the fact that the cassette and its components including the processor must be capable of mass production manufacturing techniques and the tolerance levels incident to such techniques for the system to be acceptable in a compeititive commercial market. Hence, it will be appreciated that the design and structural organization of the means by which the processing fluid is distributed onto the film during processing is extremely critical to the overall system in which the cassette is used.

SUMMARY OF THE INVENTION

In accordance with the present invention, the processor in a photographic film cassette of the type referred to is provided with a nozzle opening through which the developing fluid is applied to the emulsion layer of the film during rewind thereof in a manner to provide a positive pressure gradient in the processing fluid in the direction of film travel. The positive pressure gradient stabilizes fluid flow and insures the required uniform distribution thereof along the exposed emulsion layer on the film. The positive pressure gradient is developed by an inclined surface formed on the processor component in which the nozzle is formed; the surface being located downstream from the nozzle and disposed in a plane which converges toward the plane of the film so as to provide a converging fluid channel which, in turn, establishes a pressure which increases in the direction of the film travel. The nozzle opening is maintained at a predetermined level above the emulsion layer on the film by edge guide runners engaging the film surface. Rails projecting from the film base on the opposite side thereof from the emulsion layer are utilized to space adjoining film turns when the film is convolutely wound and thereby prevent disturbance of the fluid layer at that time. To insure that minimum deflection of the film occurs as a result of the positive pressure gradient during application of the fluid, a pressure pad is provided on the opposite side of the film from the nozzle and is contoured to the railed cross-section of the film.

Among the objects of the present invention are therefore: the provision of an improved processor for photographic film cassettes of the type referred to above; the provision of a unique nozzle unit for such a processor which provides a converging fluid channel during application of the developing fluid; and the provision of a processor assembly of the type referred to which is adaptable for use with film having edge rails without causing substantial deflection of the central area of the film carrying the exposed emulsion layer during pressure application of the processing fluid.

Other objects and further scope of applicability of the present invention will become apparent from the detailed description to follow taken in conjunction with the accompanying drawings.

DESCRIPTION OF THE PREFERRED EMBODIMENT

Figure 1:
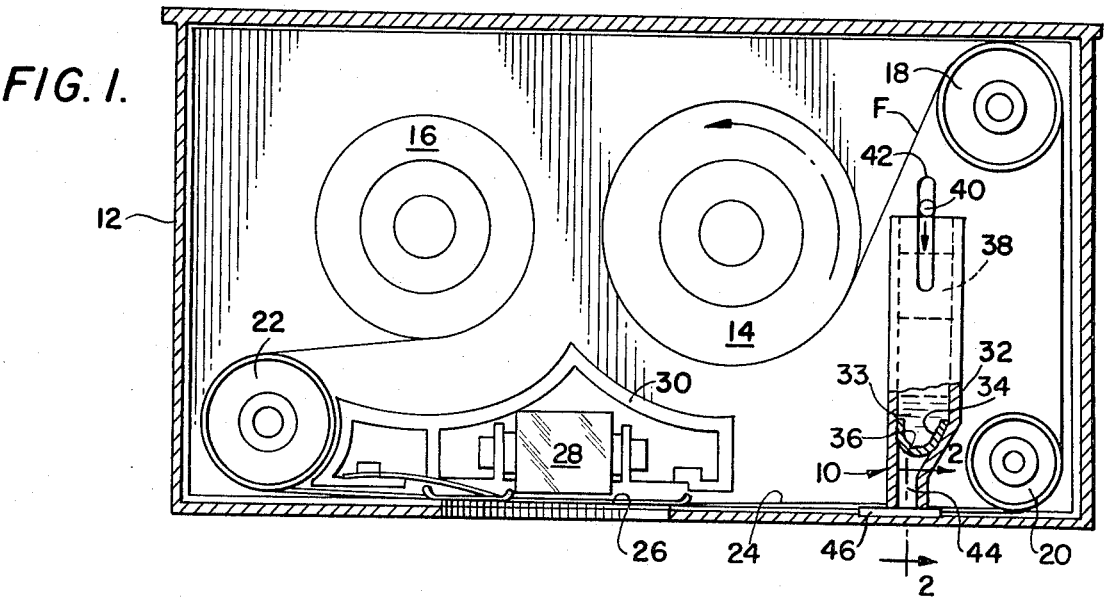
FIG. 1 is a vertical cross-section of a film cassette incorporating the improvements of the present invention.

In the drawings, the improved processor of this invention is generally designated by the reference numeral 10. As shown in FIG. 1, the processor is contained within a film cassette 12 having a supply spool 14, a take-up spool 16 and three rollers 18, 20 and 22 which establish the path of a film strip F in its passage between the supply and take-up spools 14 and 16. Thus, the idler roll 20 and the roller 22 establish a substantially linear film run 24 past the processor 10 and a pressure plate 26 which includes an exposure opening (not shown). A reflecting prism 28 is provided behind the film and pressure plate 26 so that projection lamp light for viewing or projection may be directed to the prism and reflected at right angles through the film, or in a downward direction through the film as the cassette is oriented in FIG. 1. A light shield 30 positioned inside of the cassette in relation to the prism 28 prevents unwanted leakage of light to the interior of the cassette 12.

In the context of the processing operation with which the present invention is primarily concerned, the rollers 18 and 22 function solely as idler rolls to guide the film through the path illustrated in FIG. 1. In the actual cassette, however, which is used also for exposure of the film in a camera (not shown) and for ultimate projection of the processed film in a viewer (also not shown), the roller 22 additionally functions as a snubber to facilitate incremental feed of the film during exposure and projection by virtue of means (not shown) provided in the camera and the viewer for locking rotation of the roller during those phases of overall cassette operation. Similarly, the roller 18 serves both in the camera and in the viewer as a bobulator roll to overcome the effects of supply spool inertia during incremental feeding of the film past the pressure plate 26 during both exposure and projection. Since these additional functions of the rollers 18 and 22 are not involved in the processing operation of the present invention, these functions will not be discussed further herein.

As shown in FIG. 1, the processor 10 includes a receptacle 32 which is preloaded with a supply of processing fluid 33 sufficient for processing the full length of film F contained in the cassette. In the disclosed embodiment, the processing fluid 33 is initially disposed within the receptacle between a seal strip 34 having a rupture line 36 and an activating piston 38 connected to a pin 40 which extends through a slot 42 in the wall of the cassette. The viewer in which the cassette is placed for processing and projection is equipped with appropriate means (not shown) for engaging the pin 40 and depressing the piston 38 sufficiently to rupture the seal 34. The lower end of the receptacle 32 extends downwardly to a discharge opening 44 overlying the film and a pressure pad 46. The structural arrangement of the discharge opening 44 and the pressure pad 46 represent the portion of the overall cassette to which the present invention is particularly directed.

Figure 2:
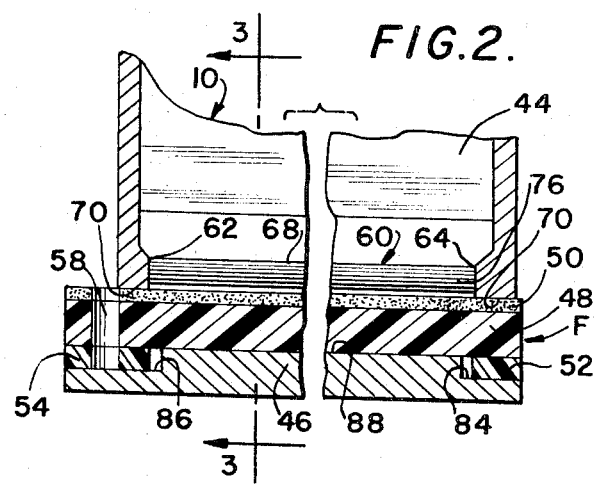
FIG. 2 is an enlarged fragmentary cross-section taken on line 2—2 of FIG. 1.
Figure 4:
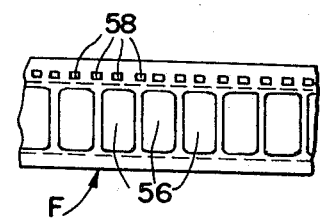
FIG. 4 is a fragmentary plan view illustrating the top or emulsion surface of the film with which the present invention is used.
Figure 3:
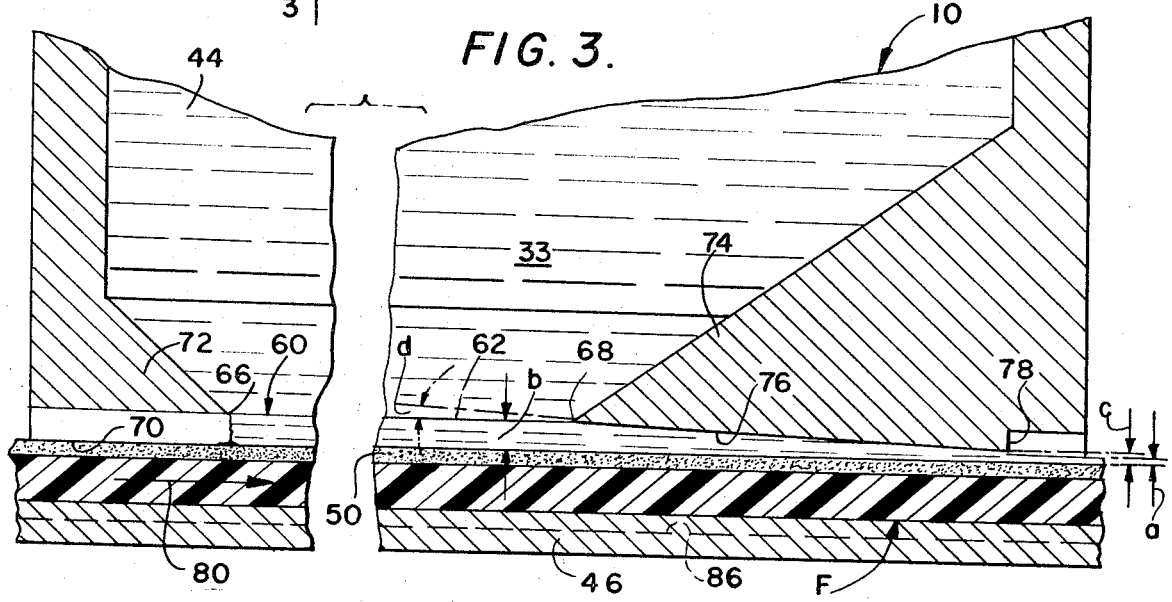
FIG. 3 is an enlarged fragmentary cross-section taken on line 3—3 of FIG. 2.

In FIGS. 2–4 of the drawings, the film F is illustrated at a large scale and can be seen in these figures to include a transparent base 48, for example, formed of polyester or other similar materials conventionally used in photographic film and provided over its upper surface with a light sensitive emulsion layer 50. Protuberances or edge rails 52 and 54 are secured along the surface of the film base opposite from the emulsion layer 50 and are configured to space adjoining film turns and prevent disturbance of the processing fluid when the film is convolutely stored on the supply spool 14. As can be seen most clearly in FIGS. 2 and 4, the inner edges of the rails 52 and 54 lie outside the central portion of the film used to receive a series of image frames 56 which function in a manner well known to the motion picture art. Also, a series of perforations 58 extend completely through the film along the edge occupied by the rail 54. These perforations are also conventional and employed in the camera and in the projector to advance the film incrementally in frame by frame fashion.

As shown in FIGS. 2 and 3, the lower end of the discharge opening 44 in the receptacle 32 opens at a nozzle 60 which, in the embodiment shown, is of rectangular configuration to establish a pair of side edges 62 and 64, a leading edge 66 and a trailing edge 68. As shown in FIG. 2, the side edges 62 and 64 extend downwardly to runner surfaces 70 and thereby establish edge guide means for the deposition of the developing fluid onto the emulsion surface 50. In addition, the runners 70 function to maintain the leading and trailing edges 66 and 68 at a precise elevation above the upper surface of the emulsion layer 50. Also it will be noted that the leading and trailing edges 66 and 68 lie on lines at the intersection of surfaces in wall portions 72 and 74. Further, the lines of the edges 66 and 68 are parallel to each other and lie in a single plane which, in turn, in the embodiment shown, is retained in parallel spaced relation to the upper surface of the emulsion layer 50 by the edge guides or runners 70.

An important feature of the present invention resides in the provision of means by which a positive pressure gradient is imparted to the developing fluid just downstream from the nozzle opening 60 in the direction of film travel during the processing operation. To achieve this pressure gradient, the wall 74, on which the trailing edge 68 of the nozzle is formed, is provided with a downwardly inclined surface 76. As shown most clearly in FIG. 3, the surface 76 preferably lies in a plane extending from the trailing edge 68 of the nozzle 60, downwardly in converging fashion towards the film to a trailing end 78. As a result of the inclined surface 76, when the run 24 in the film F is moved in the direction of the arrow 80 in FIG. 3, the fluid 33 located between the surface 76 and the emulsion layer 50 is forced through a converging channel and will experience a gradual pressure buildup as a result of film movement. The effect of this increasing fluid pressure in the direction of film travel, or that is, of the positive pressure gradient, is that the fluid 33 is spread substantially uniformly across the emulsion layer 50 between the edges 62 and 64 (see FIG. 2) of the nozzle to a thickness represented by the dimension $a$ in FIG. 3.

To enable a complete understanding of the geometry of the nozzle 60 and the inclined surface 76, exemplary dimensions found to be satisfactory in use are set forth, and include a nozzle width of 0.225 inch between the edges 62 and 64 with a nozzle length between the leading and trailing edges 66 and 68 of 0.070 inch. The height of the nozzle plane above the emulsion as established by the runners 70 and indicated in FIG. 3 by the dimension $b$ is desirably 0.0021 inch whereas the height of the trailing end of the inclined surface 76 above the emulsion layer 50 as indicated by the dimension c in FIG. 3 is preferably 0.0007 inch. Further, the length of the inclined surface in the plane of the film is preferably 0.030 inch which establishes an angle of inclination in the gradient forming surface 76 of approximately 2°40 feet, this latter angle being designated in FIG. 3 by the reference letter d. The height of the trailing end of the inclined surface above the emulsion layer 50 provides a fluid coating with a thickness represented by the reference letter a of approximately 0.0005 inch. In connection with these specific dimensions, it might be noted that in FIG. 2, the vertical scale is approximately ten times the horizontal scale thus distorting proportion somewhat. In FIG. 3, the vertical and horizontal scales are the same. It should be noted that while an inclination angle of approximately 2°40 feet is given in the example, generally an angle of less than 6° is preferred and still greater angles may be suitable.

Because of the extremely close tolerances involved, it is important to minimize bowing, or that is, transverse deflection of the film F with respect to the nozzle 60 and surface 76 as it passes beneath the nozzle. To this end, a pressure pad 46 is mounted in the cassette 12 to be positioned on the opposite side of the film from the nozzle 60 and surface 76. The contour of the pressure pad 46 is illustrated most clearly in FIG. 2 of the drawings to include a pair of steps 84 and 86 underlying the rails 52 and 54. This enables a planar central surface 88 to underlie and support the film F so that the film and particularly its emulsion layer 50 is constrained to a planar orientation during its passage under the nozzle 60 and the inclined surface 76. In other words, the pressure buildup under the surface 76 will not result in deflection of the film as otherwise would occur but for the stepped pressure pad functioning to support the film against such deflection. Advantageously, the rails are employed to engage the stepped surfaces 84 and 86. Hence, the center portion 88 is made equal to or only slightly shorter, for example, 0.0002 inch shorter than the rail height. Now, rails of two to four times the fluid thickness are employed so as to adequately protect the fluid layer. Hence, in the specific example, where the fluid layer is 0.0005 inch, the rails are about 0.0015 inch high, and the center is 0.0002 inch less, or that is 0.0013 inch so as to provide an exceedingly small clearance to the center of the film. Hence, the support pad effectively eliminates film bowing due to the fluid pressure.

In operation of the cassette 12, the film F as supplied in its unexposed condition will be contained entirely on the supply spool 14 with a leader extending about the rollers 18, 20 and 22 to the take-up spool 16. When inserted in a camera adapted to receive the cassette, the film is advanced by the camera mechanism incrementally past the pressure plate 26 and framing opening formed therein to the take-up spool 16. After the film has been completely exposed in the camera and is therefore completely wound on the take-up spool 16, the cassette is removed from the camera and inserted in a specially designed viewer operable in either a processing mode or a projecting mode and equipped with means cooperable with the various operating components of the cassette.

Assuming the exposed film has not been processed, the viewer is operated in the processing mode which effects a depression of the piston 38 to rupture the seal 36 and allow the developing fluid in the container 32 to flow by gravity into the discharge opening 44 to the nozzle 60. Simultaneously with the rupture of the seal 34, the supply spool is driven by the viewer mechanism to effect motion of the film F in the direction of the arrow across the nozzle 60 and surface 76, and between them and the pressure pad 46. The fluid 33 will be coated on the emulsion 50 during this operation in the manner described above and the supply thereof in the container 32 depleted when the film F completely fills the supply spool 14. As previously indicated, since portions of the developing fluid coating may not have dried completely prior to the rewinding of the film on the supply spool, the rails 52 and 54 are utilized to space adjoining film turns so as to avoid disturbance of the fluid treated portions. Preferably, the thickness of the rails 52 and 54 is 2 to 4 times the depth of the developing fluid coating so that successive convolutions of the film on the supply spool are adequately spaced over the central region on which the developing fluid is deposited. Thereafter, the film, now being completely developed, may be advanced incrementally frame by frame past the reflecting prism 28 to which a light from a projection lamp in the viewer is directed.

Thus it will be seen that by this invention there is provided an improved processor for photographic film cassettes of the described type and by which the above mentioned objectives are completely fulfilled. Also it will be appreciated that many variations may be made in the disclosed embodiment without departing from the true spirit of the invention. For example, the organization of the fluid receptacle 32 may be modified to include a pod-like unit equipped with a tear strip rupture facility. Alternatively, a self-contained envelope of fluid may be housed in the receptacle and the latter opened with any one of several acceptable means for rupturing the envelope upon the initiation of the processing cycle. It will be appreciated, therefore, that the foregoing description is illustrative only of a preferred embodiment, not limiting, and that the true spirit and scope of the present invention will be determined by reference to the appended claims.

We claim:

1. A device for applying processing fluid to the emulsion surface of a photographic film strip having a pair of spaced parallel side rails extending lengthwise along the longitudinal margins of the other surface of such film strip, the device also containing a processor operative to deposit processing fluid on the emulsion surface of a moving run of the film strip after exposure of its emulsion, the improvement comprising:

means defining a nozzle opening in a given plane;

means, including a pressure pad located in spaced relation to such nozzle opening, for supporting at least a portion of such film intermediate such rails in a plane substantially parallel to the plane of said nozzle opening; and means for providing a positive pressure in such fluid downstream from said nozzle opening in the direction of film travel so as to facilitate uniform distribution of such fluid laterally of such emulsion and to urge such film towards said supporting pressure pad during the application of such fluid.

2. The device recited in claim 1 wherein said pressure pad is contoured in a cross-section transverse to the direction of film travel to complement the cross-section of such film and its side rails.

3. The device recited in claim 1 wherein said pressure pad is contoured in cross-section transverse to the direction of film travel to complement the cross-section of such film and its side rails so as to define a raised surface portion intermediate a pair of laterally spaced rail supporting surfaces, and said raised surface portion extending above said rail supporting surfaces a distance substantially equal to or slightly shorter than the height of such rails.

4. In a cassette containing photographic film having a light sensitive emulsion on one surface thereof and also containing a processor operative to deposit processing fluid on a moving run of the film after exposure of such emulsion, the improvement comprising:

means defining a nozzle opening in a given plane;

means including a pressure pad located in spaced relation to such nozzle opening, for supporting at least a portion of such film intermediate the longitudinal margins thereof in a plane substantially parallel to the plane of said nozzle opening; and means for providing a positive pressure in such fluid downstream from said nozzle opening in the direction of film run travel to facilitate uniform distribution of such processing fluid laterally of such emulsion and to urge such film towards said supporting pressure pad during the application of such fluid, said pressure providing means comprising an inclined surface extending from the vicinity of a trailing edge of said nozzle opening and converging towards the emulsion surface of such film, said inclined surface extending at an angle of less than 6° towards the emulsion surface of such film.

5. In a cassette containing photographic film having a light sensitive emulsion on one surface thereof and also containing a processor operative to deposit processing fluid on a moving run of the film after exposure of such emulsion, the improvement comprising:

means defining a nozzle opening in a given plane;

means, including a pressure pad located in spaced relation to such nozzle opening, for supporting at least a portion of such film intermediate the longitudinal margins thereof in a plane substantially parallel to the plane of said nozzle opening; and means for providing a positive pressure in such fluid downstream from said nozzle opening in the direction of film run travel to facilitate uniform distribution of such processing fluid laterally of such emulsion and to urge such film towards said supporting pressure pad during the application of such fluid, said pressure providing means comprising an inclined surface extending from the vicinity of a trailing edge of said nozzle opening and converging towards the emulsion surface of said film, said inclined surface lies in a single plane and is inclined at an angle of about 2°40 feet with respect to the emulsion surface of such film.

6. In a cassette containing photographic film having a light sensitive emulsion on one surface thereof and a pair of spaced parallel side rails extending lengthwise along the longitudinal margins of the other surface of such film strip, the cassette also containing a processor operative to deposit processing fluid on the emulsion surface of a moving run of the film strip after exposure of the emulsion the improvement comprising:

means defining a nozzle opening in a given plane;

means, including a pressure pad located in spaced relation to such nozzle opening, for supporting at least a portion of such film intermediate such rails in a plane substantially parallel to the plane of said nozzle opening, said pressure pad providing a planar surface portion configured to fit within said rails and support such film during said application of such fluid; and means for providing a positive pressure in such fluid downstream from said nozzle opening in the direction of film travel so as to facilitate uniform distribution of such fluid laterally of such emulsion and to urge such film towards said supporting pressure pad during the application of such fluid.

7. In a cassette containing photographic film having a light sensitive emulsion on one surface thereof and a pair of spaced parallel side rails extending lengthwise along the longitudinal margins of the other surface of such film strip, the cassette also containing a processor operative to deposit processing fluid on the emulsion surface of a moving run of the film strip after exposure of the emulsion, the improvement comprising:

means defining a nozzle opening in a given plane;

means, including a pressure pad located in spaced relation to such nozzle opening, for supporting at least a portion of such film intermediate such rails in a plane substantially parallel to the plane of said nozzle opening, said pressure pad being contoured in a cross-section transverse to the direction of film travel to complement the cross-section of the film and side rails thereon; and means for providing a positive pressure in such fluid downstream from said nozzle opening in the direction of film travel so as to facilitate uniform distribution of such fluid laterally of such emulsion and to urge such film towards said supporting pressure pad during the application of such fluid.

* * * * *